(12) United States Patent
Rao

(10) Patent No.: US 11,068,736 B2
(45) Date of Patent: Jul. 20, 2021

(54) METHOD AND APPARATUS FOR DETECTING TARGET OBJECTS IN IMAGES

(71) Applicant: BOE Technology Group Co., Ltd., Beijing (CN)

(72) Inventor: Tianmin Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/597,075

(22) Filed: Oct. 9, 2019

(65) Prior Publication Data

US 2020/0234072 A1 Jul. 23, 2020

(30) Foreign Application Priority Data

Jan. 21, 2019 (CN) .......................... 201910053816.3

(51) Int. Cl.
*G06K 9/32* (2006.01)
*G06T 7/90* (2017.01)
*G06K 9/46* (2006.01)

(52) U.S. Cl.
CPC ......... *G06K 9/3241* (2013.01); *G06K 9/4642* (2013.01); *G06T 7/90* (2017.01); *G06T 2207/20016* (2013.01)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06T 7/90; G06T 2207/20016; G06T 2207/10024; G06K 9/00771; G06K 9/6202; G06K 9/00221; G06K 9/00335; G06K 9/00369; G06K 9/3241; G06K 9/4642; G06N 3/04; G06N 3/08; H04N 7/181; H04N 5/2226; G08C 17/00; G08C 17/02

See application file for complete search history.

(56) References Cited

U.S. PATENT DOCUMENTS

| 10,430,663 | B2 * | 10/2019 | Chiang ................ G06K 9/6269 |
| 2016/0012600 | A1 * | 1/2016 | Kitajima ............... G06T 1/0007 382/224 |
| 2017/0053416 | A1 * | 2/2017 | Odagiri ..................... G06T 7/74 |

OTHER PUBLICATIONS

Dollár et al., "Fast Feature Pyramids for Object Detection," IEEE Transactions on Pattern Analysis and Machine Intelligence, vol. 36, No. 8, Aug. 2014, pp. 1532-1545.

* cited by examiner

*Primary Examiner* — Duy M Dang
(74) *Attorney, Agent, or Firm* — Myers Bigel, P.A.

(57) ABSTRACT

A method for detecting a target object in an image is described. The method includes obtaining an image to be detected, determining a first layer of an image pyramid as a current layer, building an image feature data set of the current layer according to the image to be detected, and detecting the target object therefrom. In response to detecting the target object, the method includes stopping the detection and outputting the detected target object; in response to not detecting the target object and the number of layers of the image pyramid not reaching a threshold for the number of layers, determining a next layer of the current layer as the current layer and returning to the building the image feature data set of the current layer according to the image to be detected and detecting the target object therefrom.

20 Claims, 7 Drawing Sheets

METHOD AND APPARATUS FOR DETECTING TARGET OBJECTS IN IMAGES

RELATED APPLICATION

The present application claims the priority of Chinese Patent Application No. 201910053816.3 filed on Jan. 21, 2019, the entire disclosure of which is incorporated herein by reference.

TECHNICAL FIELD

The present disclosure relates to the technical field of image processing, in particular to a method and an apparatus for detecting a target object in an image, a computing device and a computer-readable storage medium.

BACKGROUND

Image pyramid is a manifestation of multi-scale presentation of images, and it is an effective but simple structure to interpret images with multiple resolutions. In image processing, image pyramids are widely used as data structures for storing multi-scale image information. However, when the scale space is dense and the amount of data stored is large, the establishment and processing of such data structures take a long time, which will undoubtedly reduce the processing speed of image or machine vision algorithm in scenarios like real-time video processing and embedded design.

Usually, for image pyramids, the strategy and structure of "building before using" is adopted. Information of respective scales of the image are built according to this strategy so as to be used in the subsequent detection process.

SUMMARY

In view of the above, the present disclosure provides a method and an apparatus for detecting target objects in images, a computing device and a computer-readable storage medium, which can improve the efficiency of detecting target objects in images to a certain extent.

According to a first aspect of the present disclosure, a method for detecting a target object in an image is provided, which comprises the steps of:
  obtaining an image to be detected;
  determining a first layer of an image pyramid as a current layer for which an image feature data set is to be built;
  building an image feature data set of the current layer of the image pyramid according to the image to be detected, and detecting the target object from the image feature data set of the current layer;
  in response to detecting the target object, stopping the detection and outputting the detected target object;
  in response to not detecting the target object and the number of layers of the image pyramid not reaching a threshold for the number of layers, determining a next layer of the current layer as the current layer for which the image feature data set is to be built and returning to the step of building the image feature data set of the current layer of the image pyramid according to the image to be detected and detecting the target object from the image feature data set of the current layer, wherein a feature resolution of the image feature data set of the next layer of the current layer is higher than that of the image feature data set of the current layer.

Alternatively, the feature resolution of the image feature data set of the first layer of the pyramid is smaller than or equal to 40×30.

Alternatively, building the image feature data set of the current layer of the image pyramid according to the image to be detected further comprises:
  building reference image layers according to the image to be detected;
  obtaining a reference image feature data set corresponding to each reference image layer according to the reference image layers;
  building the image feature data set of the current layer of the pyramid based on the reference image feature data sets.

Alternatively, building the reference image layers according to the image to be detected comprises:
  determining the number of the reference image layers;
  scaling the image to be detected by using a bilinear interpolation method to obtain the reference image layers, wherein one reference image layer is obtained from each scaling, and the number of times of scaling is one less than the number of the reference image layers.

Alternatively, obtaining a reference image feature data set corresponding to each reference image layer according to the reference image layers comprises:
  extracting luminance and chroma features of said each reference image layer;
  extracting gradient amplitude features and an orientation angle of said each reference image layer according to the luminance and chroma features of the reference image layer;
  extracting histogram of oriented gradient features of the reference image layer according to the gradient amplitude features and orientation angle of the reference image layer;
  determining the luminance and chroma features, the gradient amplitude features and the histogram of oriented gradient features as the reference image feature data set corresponding to the reference image layer.

Alternatively, building the image feature data set of the current layer of the pyramid based on the reference image feature data sets comprises:
  determining the number of hierarchies of the image feature data sets of the pyramid;
  determining the number of hierarchies of intermediate image feature data sets of the pyramid according to the number of hierarchies of the reference image feature data sets of the pyramid and the number of hierarchies of the image feature data sets of the pyramid;
  determining the number of hierarchies of intermediate image feature data sets between the adjacent reference image feature data sets of the pyramid according to the number of hierarchies of the reference image feature data sets of the pyramid and the number of hierarchies of the intermediate image feature data sets of the pyramid;
  in response to the current layer of the pyramid being a reference image layer, directly invoking the reference image feature data set corresponding to the reference image layer as the image feature data set of the current layer;
  in response to the current layer of the pyramid being an intermediate image layer between the reference image layers, down-sampling or up-sampling the reference image feature data set of a reference image layer adjacent to the intermediate image layer so as to obtain an intermediate image feature data set corresponding to the intermediate image layer as the image feature data set of the current layer.

Alternatively, a sampling coefficient for the down-sampling or up-sampling is determined by the following steps of:

formulating an image resolution fitting function based on the reference image layer;

calculating an image resolution of the intermediate image layer according to the image resolution fitting function;

determining a ratio of the image resolution of the intermediate image layer to that of the reference image layer as the sampling coefficient.

Alternatively, the image resolution fitting function is a 6-power polynomial function.

Alternatively, detecting the target object from the image feature data set of the current layer comprises:

detecting the target object from the image feature data set of the current layer using an ACF algorithm.

According to a second aspect of the present disclosure, an apparatus for detecting a target object in an image is provided, which comprises:

an obtainer configured to obtain an image to be detected;
a detector configured to:
determine a first layer of an image pyramid as a current layer for which an image feature data set is to be built;
build an image feature data set of the current layer of the image pyramid according to the image to be detected, and detect the target object from the image feature data set of the current layer;
in response to detecting the target object, stop the detection and output the detected target object;
in response to not detecting the target object and the number of layers of the image pyramid not reaching a threshold for the number of layers, determine a next layer of the current layer as the current layer for which the image feature data set is to be built and return to build the image feature data set of the current layer of the image pyramid according to the image to be detected and detect the target object from the image feature data set of the current layer, wherein a feature resolution of the image feature data set of the next layer of the current layer is higher than that of the image feature data set of the current layer.

Alternatively, the feature resolution of the image feature data set of the first layer of the pyramid is smaller than or equal to 40×30.

Alternatively, the detector is further configured to:
build reference image layers according to the image to be detected;
obtain a reference image feature data set corresponding to each reference image layer according to the reference image layers;
build the image feature data set of the current layer of the pyramid based on the reference image feature data sets.

Alternatively, the detector is further configured to:
determine the number of the reference image layers;
scale the image to be detected by using a bilinear interpolation method to obtain the reference image layers, wherein one reference image layer is obtained from each scaling, and the number of times of scaling is one less than the number of the reference image layers.

Alternatively, the detector is further configured to:
extract luminance and chroma features of said each reference image layer;

extract gradient amplitude features and an orientation angle of the reference image layer according to the luminance and chroma features of the reference image layer;
extract histogram of oriented gradient features of the reference image layer according to the gradient amplitude features and the orientation angle of the reference image layer;
determine the luminance and chroma features, the gradient amplitude features and the histogram of oriented gradient features as the reference image feature data set corresponding to the reference image layer.

Alternatively, the detector is further configured to:
determine the number of hierarchies of the image feature data sets of the pyramid;
determine the number of hierarchies of intermediate image feature data sets of the pyramid according to the number of hierarchies of the reference image feature data sets of the pyramid and the number of hierarchies of the image feature data sets of the pyramid;
determine the number of hierarchies of intermediate image feature data sets between the adjacent reference image feature data sets of the pyramid according to the number of hierarchies of the reference image feature data sets of the pyramid and the number of hierarchies of the intermediate image feature data sets of the pyramid;
in response to the current layer of the pyramid being a reference image layer, directly invoke the reference image feature data set corresponding to the reference image layer as the image feature data set of the current layer;
in response to the current layer of the pyramid being an intermediate image layer between the reference image layers, down-sample or up-sample the reference image feature data set of a reference image layer adjacent to the intermediate image layer so as to obtain an intermediate image feature data set corresponding to the intermediate image layer as the image feature data set of the current layer.

Alternatively, the detector is further configured to:
formulate an image resolution fitting function based on the reference image layer;
calculate an image resolution of the intermediate image layer according to the image resolution fitting function;
determine a ratio of the image resolution of the intermediate image layer to that of the reference image layer as the sampling coefficient.

Alternatively, the image resolution fitting function is a 6-power polynomial function.

Alternatively, the detector is configured to detect the target object from the image feature data set of the current layer using an ACF algorithm.

According to a third aspect of the present disclosure, a computing device is provided, which comprises:
at least one processor; and
a memory communicatively connected to the at least one processor;
wherein,
the memory is configured to store computer-executable instructions which, when being executed by the at least one processor, enable the at least one processor to execute any one of the above described methods.

According to a fourth aspect of the present disclosure, a computer-readable storage medium is provided which stores computer-executable instructions, wherein when the computer-executable instructions are executed by a processor, any one of the above described methods is executed.

BRIEF DESCRIPTION OF THE DRAWINGS

In order to more clearly illustrate the technical solutions of the embodiments of the present disclosure, the embodiments of the present disclosure will be described with reference to the accompanying drawings. Obviously, the drawings below relate only to some embodiments of the present disclosure, but they do not mean to limit the present disclosure.

DETAILED DESCRIPTION OF EMBODIMENTS

In order to make the object, technical solutions and advantages of the embodiments of the present disclosure clearer, technical solutions in embodiments of the present disclosure will be described clearly and completely in conjunction with the drawings of the embodiments. Obviously, the described embodiments are only some, instead of all, of the embodiments of the present disclosure. Based on the described embodiments of the present disclosure, it is easy for those skilled in the art to think of all other embodiments that fall within the scope of protection of the present disclosure.

Unless otherwise defined, the technical or scientific terms used in this disclosure shall be of the general meaning to those with general skills in the field to which the disclosure belongs. The words "first", "second" and the like used in this disclosure do not indicate any order, quantity or importance, but they are used to distinguish different components. Similarly, words such as "one", "a" and "said" do not indicate quantitative restrictions, but rather the existence of at least one. The wording such as "include" or "comprise" indicates that the component or object before said wording contains the elements or objects listed after said wording and their equivalents without excluding other elements or objects. The wording like "connected to" or "coupled to" is not limited to physical or mechanical connection, but it may also include electrical connection, either direct or indirect. The words "above", "under", "left", "right" and so on are only used to represent relative positional relationships, and when the absolute position of the described object changes, the relative positional relationship may also change accordingly.

Figure 1:
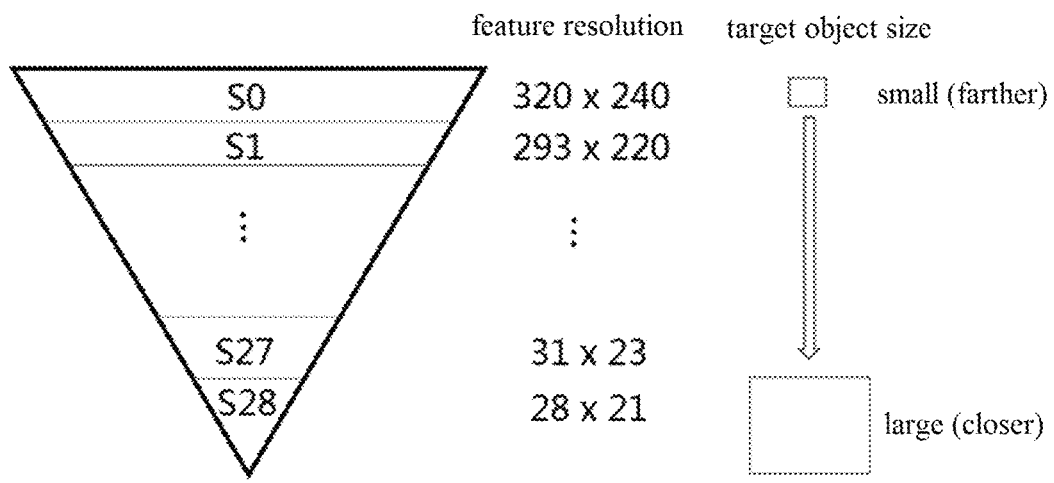
FIG. 1 illustrates a schematic diagram of an image pyramid.

FIG. 1 is a schematic diagram of an image pyramid. In the method for detecting a target object, the image processing flow includes feature extraction and target object detection. In the process of feature extraction, features of different scales are stored in different layers (e.g., layers S0, S1, ... , S28 in FIG. 1) in the form of a "pyramid" data structure for detecting target objects of different sizes. As shown in FIG. 1, in the method for detecting a target object, the size of the target object that can be detected increases with the decrease of the feature resolution (i.e., scale). In the process of pyramid building, the larger the feature resolution is, the smaller the size of the target object that can be detected and the more the data calculations involved; on the contrary, the smaller the feature resolution is, the larger the size of the target object that can be detected and the less the data computations involved. Therefore, when building the image pyramid, the layer with a larger resolution requires a large amount of computations, and the processing time needed is longer.

Figure 2:
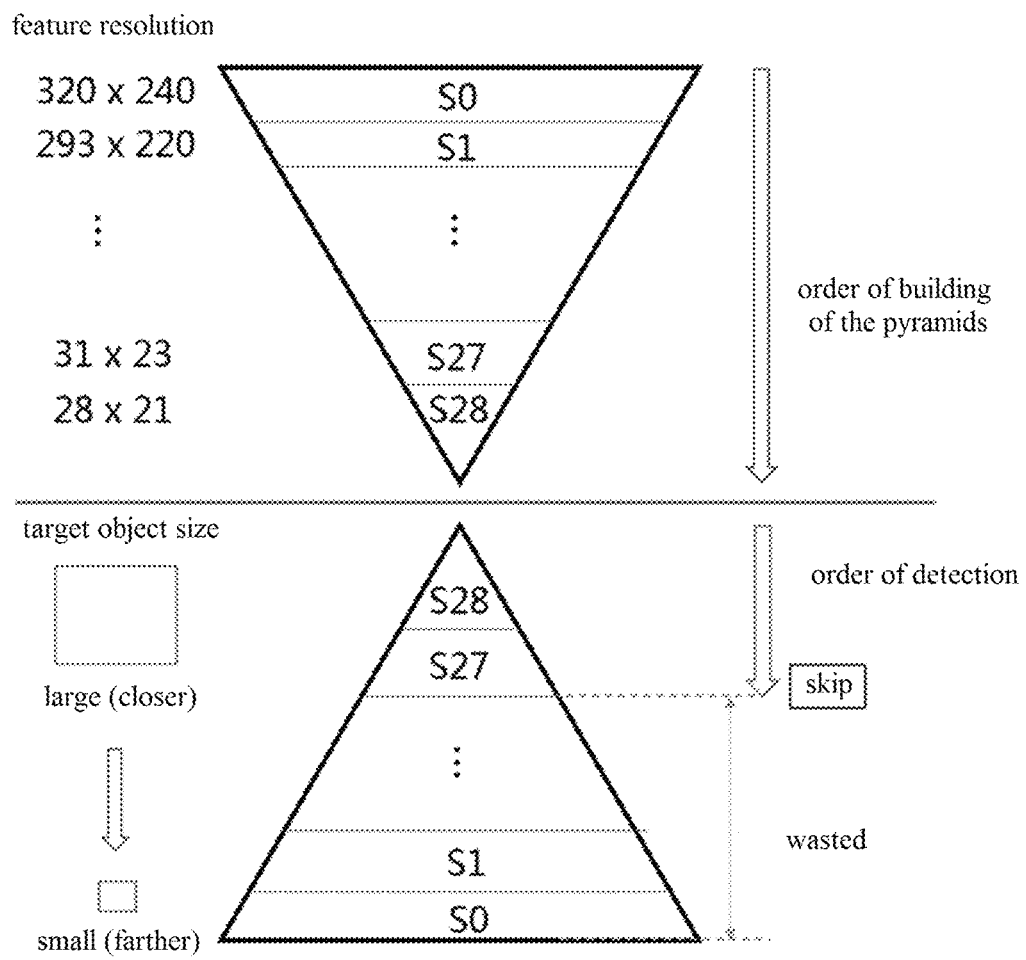
FIG. 2 illustrates a schematic diagram of the process of building the image pyramid and the process of detecting a target object.

For example, in the process of detecting vehicles in an image, when working in a single target detection mode, the detecting process stops searching for target objects of the follow-up scales after encountering a nearby vehicle, and the time consumed in building the data structure is also wasted. Moreover, farther target objects have higher feature resolutions, so the time needed for building the data structure for them is longer, which means that more time is wasted. However, the target object detection strategy starts with a pyramid layer with relatively nearer and larger small-scale features. FIG. 2 shows a strategy of building an image pyramid statically. Firstly, pyramid data of all scales are built layer by layer. Then, target object detection begins from the pyramid layer of the smallest scale, and once the target object detection is completed at the small-scale pyramid layer (i.e., a target object is detected, which usually has a larger size in the image to be detected), the detection process will be exited, while the subsequent large-scale pyramid data will be wasted and the time consumed in building the pyramid is also wasted, which make the whole detection process inefficient.

According to an embodiment of the present disclosure, a method for detecting a target object in an image is provided, which can improve the efficiency of detecting target objects in images to some extent.

Figure 3:
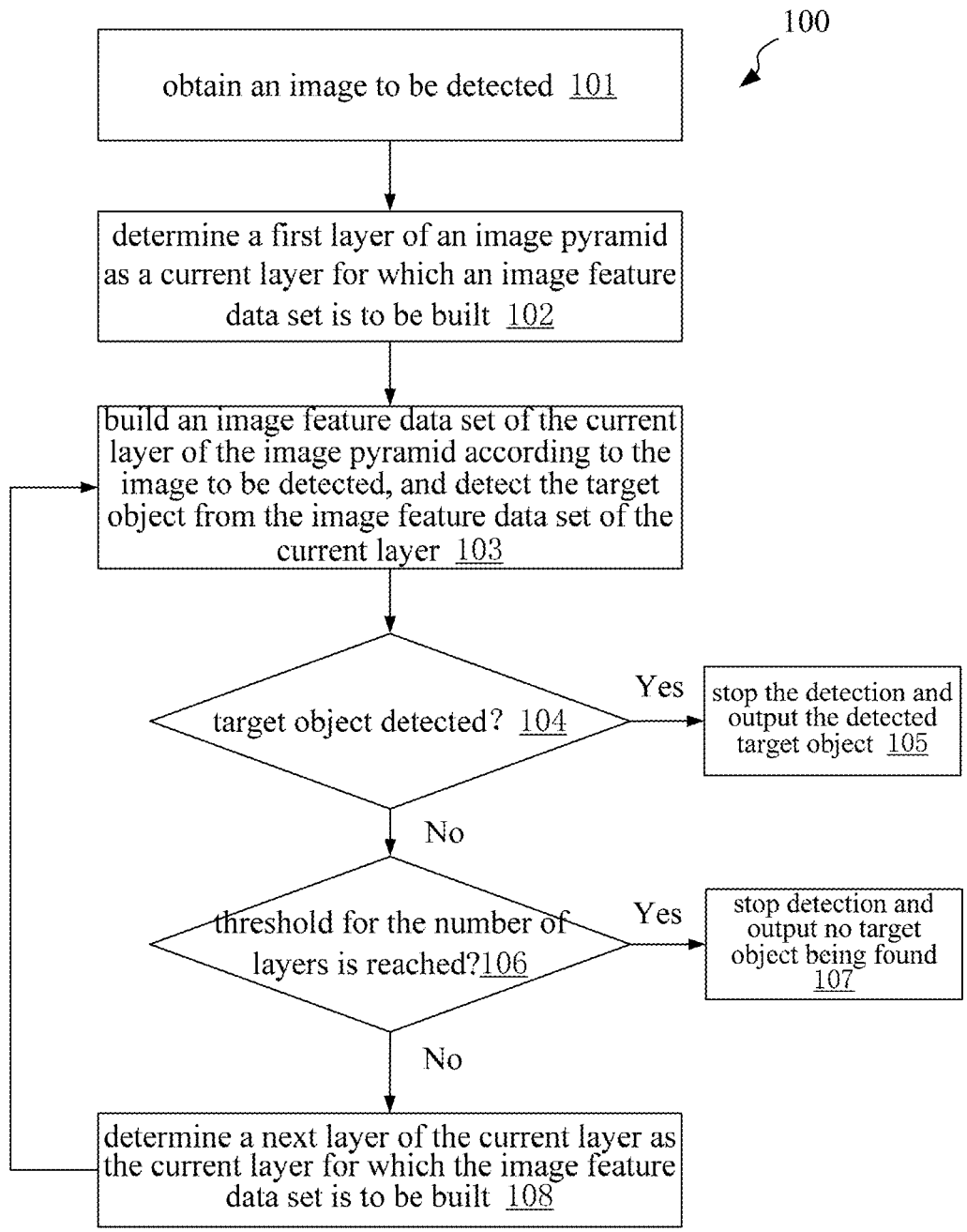
FIG. 3 is a schematic flow chart of a method for detecting a target object in an image according to an embodiment of the present disclosure.

As shown in FIG. 3, a method 100 for detecting a target object in an image includes the following steps 101-108.

In step 101, an image to be detected is obtained.

In step 102, a first layer of an image pyramid is determined as a current layer for which an image feature data set is to be built.

In step 103, an image feature data set of the current layer of the image pyramid is built according to the image to be detected, and the target object is detected from the image feature data set of the current layer.

In step 104, it is determined whether the target object is detected. In step 105, in response to detecting the target object, the detection is stopped and the detected target object is output. In other words, if any target object is detected, the detection process is exited and no new pyramid data set will be built any more, meanwhile, the rest detection process will be skipped.

In step 106, in response to not detecting the target object, it is determined whether the number of layers of the image pyramid that have been built has reached a threshold for the number of layers, and in response to the number of layers of the image pyramid that have been built reaching the threshold for the number of layers, the detection process will be stopped in step 107 and output that no target object is detected.

In response to the number of layers of the image pyramid that have been built not reaching the threshold for the number of layers, in step 108, a next layer of the current layer is determined as the current layer for which the image feature data set is to be built and return to step 103 to continue execution, wherein a feature resolution corresponding to the image feature data set of the next layer of the current layer is higher than a feature resolution corresponding to the image feature data set of the current layer. For example, if the current layer is the $N^{th}$ layer, then the next layer of the current layer is the $(N+1)^{th}$ layer, N being a positive integer, and the feature resolution of the image feature data set of the $(N+1)^{th}$ layer is higher than the feature resolution of the image feature data set of the $N^{th}$ layer.

Alternatively, the feature resolution of the image feature data set of the first layer of the pyramid is smaller than or equal to 40×30, such that the method for detecting target objects in images can detect target objects of large sizes from the very beginning, and as the feature resolution of the image feature data set increases, the sizes of the target objects that can be detected decrease gradually.

In the method for detecting a target object in an image as provided in the embodiment of the present disclosure, the image pyramid is built dynamically and the target object is detected dynamically at the same time. Target detection is performed immediately after building the image feature data set of one layer of the pyramid, and if no target object is detected, the image feature data set of the next layer of the pyramid is built, until a target object is detected. In this case, there is no need to build a complete image pyramid at one time, thus improving the efficiency of image detection. Compared with the problem of time loss in the static image pyramid building, the method for detecting a target object in an image provided in the embodiment of the present disclosure makes the process of building the image pyramid dynamic and detects the target objects dynamically, thus alleviating the conflict of statically building the complete pyramid data but not accessing some of the data thereof, i.e. reducing the time loss, as a result, the operation efficiency of the whole detection process is improved.

Figure 4:
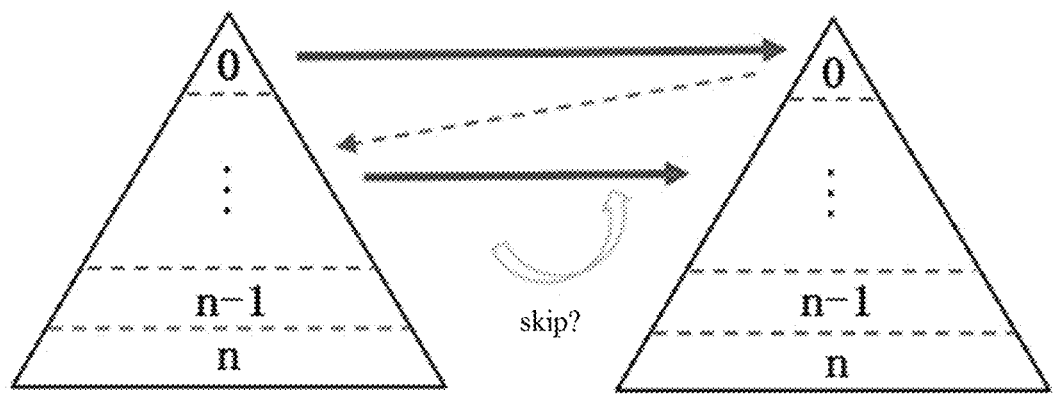
FIG. 4 is a schematic diagram of the process of building the image pyramid and the process of detecting a target object according to an embodiment of the present disclosure.

An embodiment of the present disclosure provides a strategy of dynamically building the image pyramid, as shown in FIG. 4. Unlike the strategy of statically building the image pyramid, the data structure of the image pyramid will not be built completely at one time. In this embodiment, when the image feature data set of the first layer with a small feature resolution is built, detection of the target object under said scale is carried out immediately, and if a target object is detected successfully, the detection process is exited and building of the image pyramid is ended; if no target object is detected, the image feature data set of the next layer is built, in which detection of target objects will be carried out.

The method for detecting a target object in an image provided in the embodiment of the present disclosure adopts the strategy of dynamically building the image pyramid, which, compared with the strategy of statically building the image pyramid, can reduce time loss and greatly improve the operation efficiency of the entire detection process. In the method for detecting a target object in an image as provided in the embodiment of the present disclosure, if there is a target object close to an observer (i.e., when the size of the target object in the image to be detected is large), the target object will be detected in the image feature data set built earlier and the detection process will be exited. In this way, it is no longer necessary to build the remaining image feature data sets, thus reducing the time consumed for building these data sets.

As an example, the target object can be any object in the image to be detected, such as a moving object like a vehicle, a pedestrian, or a static object like a street view, a road sign, etc. This is not restrictive, as long as image processing and target object detection are involved, the method for detecting a target object in an image provided by the embodiment of the present disclosure can be applied.

Figure 5:
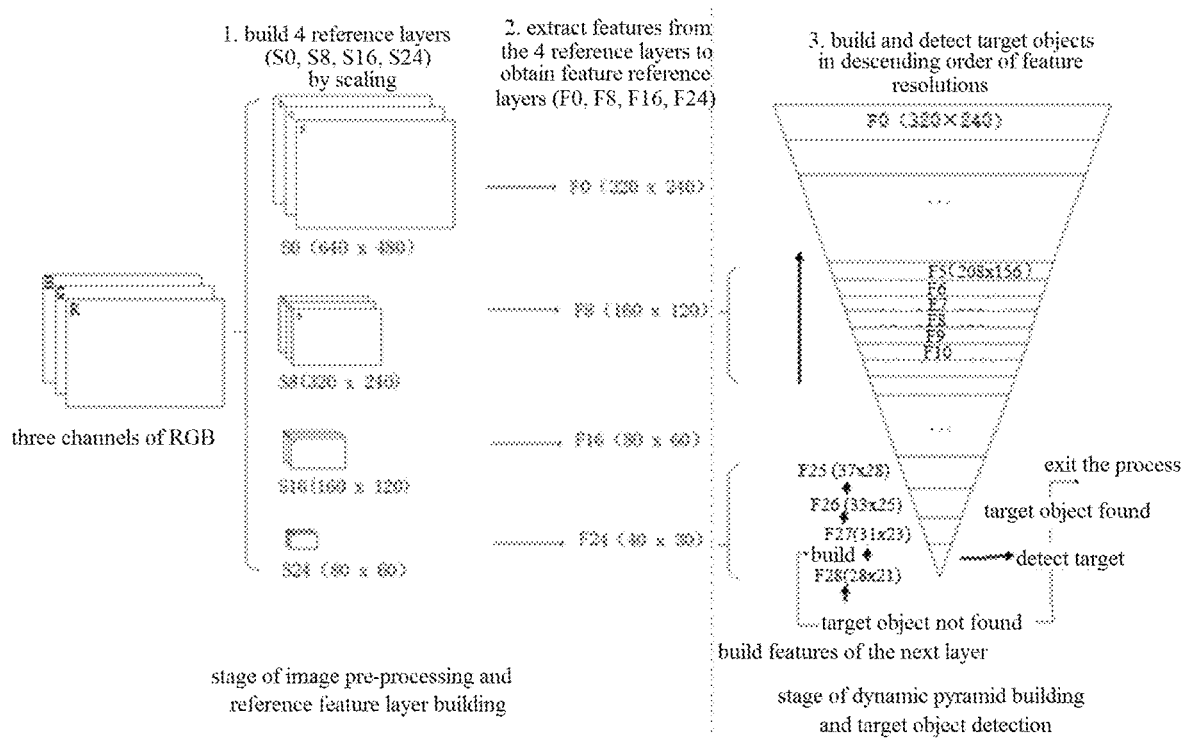
FIG. 5 is a schematic diagram of the process of carrying out the method for detecting a target object according to an embodiment of the present disclosure.

According to an embodiment of the present disclosure, the specific process of building low-resolution to high-resolution image feature data sets of the image pyramid can be implemented in the following manner, as shown in FIG. 5.

As an example, the pyramid built in an embodiment of the present disclosure has 29 layers (in order to adapt the camera to capture the target objects of different distances, dense layers are built). Before building the image feature data sets of the pyramid, parameters of the pyramid are preset, including that a preset total number of layers of the image pyramid is 29, an image resolution of a reference image in the first layer of the pyramid, and a feature resolution of an image feature data set in the first layer of the pyramid. Taking an input image with a resolution of 640×480 as an example, the image resolution of the reference image in the first layer of the pyramid is 80×60, and the feature resolution of the image feature data set in the first layer of the pyramid is 28×21.

It should be pointed out here that the pyramid of 29 layers is only an example, which does not mean that the pyramid built in this disclosure must have 29 layers, and the specific number of layers can be adjusted as required, and the number of reference layers and intermediate layers can also be adjusted accordingly. Of course, the resolution of each layer of the pyramid may be different and should not be limited to embodiments of the present disclosure. Meanwhile, these parameters may change according to the specific building process. It is also important to know that, depending on the different target object to be detected, the number of layers and corresponding parameters of the pyramid may also differ, and these changes are within the scope of protection of the present disclosure.

For example, as shown in Table 1 below, the preset total number of layers of the pyramid is 29, with seven intermediate layers between reference layers whose image resolution is a multiple of one fourth of the maximum image resolution. That is to say, the layers with the image resolutions of 640×480, 320×240, 160×120, 80×60 are the reference image layers. The image resolutions of the intermediate layers can be determined by using the reference image layers, for example, by using a fitting function.

TABLE 1

| layer of image | image resolution | layer of feature | feature resolution | reference layer |
|---|---|---|---|---|
| S0 | 640x480 | F0 | 320x240 | — |
| S1 | 586x440 | F1 | 293x220 | S0/F0 |
| S2 | 538x404 | F2 | 269x202 | S0/F0 |
| S3 | 494x370 | F3 | 247x185 | S0/F0 |
| S4 | 454x340 | F4 | 227x170 | S0/F0 |
| S5 | 416x312 | F5 | 208x156 | S8/F8 |
| S6 | 382x286 | F6 | 191x143 | S8/F8 |
| S7 | 350x262 | F7 | 175x131 | S8/F8 |
| S8 | 320x240 | F8 | 160x120 | — |
| S9 | 294x220 | F9 | 147x110 | S8/F8 |
| S10 | 306x202 | F10 | 153x101 | S8/F8 |
| S11 | 248x186 | F11 | 124x93 | S8/F8 |
| S12 | 226x170 | F12 | 113x85 | S8/F8 |
| S13 | 208x156 | F13 | 104x78 | S16/F16 |
| S14 | 190x142 | F14 | 95x71 | S16/F16 |
| S15 | 174x130 | F15 | 87x65 | S16/F16 |
| S16 | 160x120 | F16 | 80x60 | — |
| S17 | 146x110 | F17 | 73x55 | S16/F16 |
| S18 | 134x100 | F18 | 67x50 | S16/F16 |
| S19 | 122x92 | F19 | 61x46 | S16/F16 |
| S20 | 112x84 | F20 | 56x42 | S16/F16 |
| S21 | 104x78 | F21 | 52x39 | S24/F24 |
| S22 | 96x72 | F22 | 48x36 | S24/F24 |
| S23 | 88x66 | F23 | 44x33 | S24/F24 |
| S24 | 80x60 | F24 | 40x30 | — |
| S25 | 73x55 | F25 | 37x28 | S24/F24 |
| S26 | 66x50 | F26 | 33x25 | S24/F24 |
| S27 | 62x46 | F27 | 31x23 | S24/F24 |
| S28 | 56x42 | F28 | 28x21 | S24/F24 |

In order to reduce the computational complexity during building, several reference image layers are built first, then features are extracted from the reference image layers to build the corresponding reference feature layers, and then features of the intermediate feature layers are obtained approximately according to the features of the reference feature layers. The method consists of two stages, i.e. a stage of image pre-processing and reference feature layer building, and a stage of dynamic pyramid building and target object detection.

The stage of image pre-processing and reference feature layer building mainly includes: building the reference image layer according to the image to be detected; and obtaining the reference image feature data set of the corresponding pyramid according to the reference image layer. Image pre-processing is mainly to scale the image to be detected so as to obtain in turn images whose resolutions decrease twice in rows and columns, respectively (there are three times of scaling, resulting in four reference layers: 640×480, 320×240, 160×120, 80×60). The image pre-processing acts on the r [red], g [green], b [blue] channels of the images, and after obtaining the reference image layers of layers S0, S8, S16 and S24 (the corresponding image resolutions are as shown in FIG. 5), features are extracted from each of the four reference image layers to obtain 10-channel reference feature layers (F0, F8, F16, F24).

The stage of dynamic pyramid building and target object detection includes building the image feature data set of the pyramid based on the reference image feature data set of the pyramid, and detecting the target object based on the built image feature data set of the pyramid. Based on the built reference feature layers (F0, F8, F16, F24), and starting with the smallest resolution (as shown in Table 1), the adjacent reference feature layers are scaled sequentially to obtain the intermediate feature layers (e.g., the feature layer F28 is built by scaling the reference feature layer F24, not by scaling the reference image layer S24 first and then extracting the features). In this way, repeated feature extraction from the images is avoided and the computational complexity is reduced. Meanwhile, in this stage, the strategy of "building" while "detecting" is implemented. When the target object is detected at a certain layer of the pyramid, building of the remaining intermediate feature layers is exited to avoid redundant subsequent processing.

The computation processes of the above-mentioned two stages are introduced in detail below so as to describe the building of the entire pyramid.

The stage of image pre-processing and reference feature layer building will now be introduced.

In order to uniformly obtain the feature data of the 29-layer pyramid as shown in Table 1, an embodiment of the present disclosure employs a bilinear interpolation method to obtain the other three reference image layers than the reference image layer corresponding to the original image resolution (i.e., the resolution of the image to be detected), so that said other three reference image layers cover seven intermediate layers. That is, said other three reference image layers generate feature data of 3×7+3=24 layers, while the reference image layer of the original image resolution generates five layers of feature data, thus a total of 29 layers of feature data are generated, as shown in Table 1.

In the implementation of the bilinear interpolation method, if a pixel value f(x, y) of a certain pixel in the target image is to be obtained, values of four adjacent pixels Q11=(x1, y1), Q12=(x1, y2), Q21=(x2, y1), Q22=(x2, y2) in the original image are needed. Then, the calculation is carried out in the following way:

$$f(x, y) = \frac{f(Q_{11})}{(x_2 - x_1)(y_2 - y_1)}(x_2 - x)(y_2 - y) + \frac{f(Q_{21})}{(x_2 - x_1)(y_2 - y_1)}(x - x_1)(y_2 - y) + \frac{f(Q_{12})}{(x_2 - x_1)(y_2 - y_1)}(x_2 - x)(y - y_1) + \frac{f(Q_{22})}{(x_2 - x_1)(y_2 - y_1)}(x - x_1)(y - y_1).$$

By this way, a new reduced image can be obtained, where the scaling ratio is 0.5 (in both row and column directions). New image data of four reference layers S0, S8, S16 and S24 can be generated in turn by this method.

Specifically, an input image (with an image resolution of 640×480 for example, and being marked as layer S0, as shown in Table 1) is scaled according to the above-mentioned formula to obtain new image data of four reference image layers S0, S8, S16, S24. The implementation of the bilinear interpolation method is as follows:

on the basis of layer S0, the image resolution is reduced by half in both row and column directions according to the above formula to obtain layer S8, as shown in Table 1, which corresponds to the image with the image resolution of 320×240;

on the basis of layer S8, the image resolution is further reduced by half in both row and column directions according to the above formula to obtain layer S16, which corresponds to the image with the image resolution of 160×120;

on the basis of layer S16, the image resolution is further reduced by half in both row and column directions according to the above formula to obtain layer S24, which corresponds to the image with the image resolution of 80×60.

After building the reference layer, features are extracted from the four reference image layers (S0, S8, S16, S24) to obtain four reference feature layers.

Specifically, after the reference image layers (S0, S8, S16, S24) with different resolutions have been built through calculation, four reference feature layers (F0, F8, F16, F24) are obtained by a feature extraction method (as described below).

Figure 6:
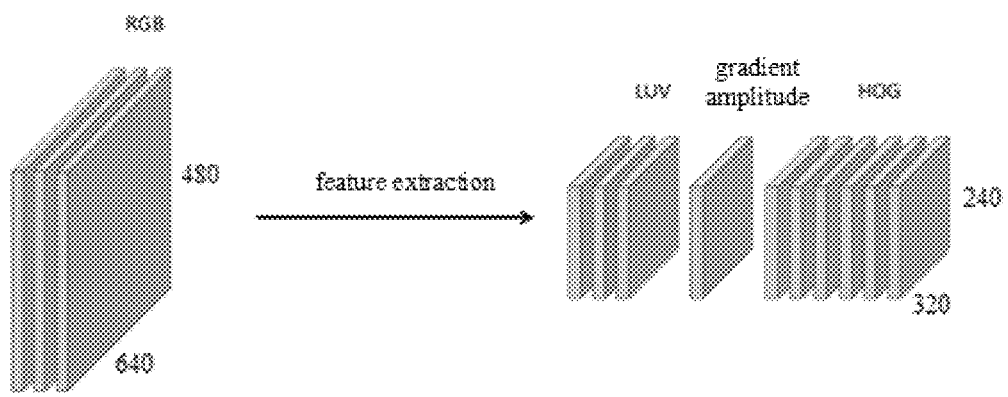
FIG. 6 is a schematic diagram of the process of extracting the image feature data set of each layer of the pyramid according to an embodiment of the present disclosure.

Referring to FIG. 6, the implementation of the feature extraction method can be described as follows:

for example, the input image is a RGB three-channel image with the resolution of 640×480, then 10-channel image features with the resolution of 320×240 can be extracted by the feature extraction method. For images with other image resolutions, their feature resolutions are one quarter of the image resolutions. The extracted 10-channel features include three-channel luminance and chroma features (LUV features), one-channel gradient magnitude features and six-channel histogram of oriented gradient features (HOG features).

The RGB three-channel image refers to the image displayed on the three scales of RGB. According to the principle of three primary colors, the light F of any color can be mixed by the three different color components of R, G and B:

$$F=r[R]+g[G]+b[B].$$

The LUV feature refers to a color space standard, which aims to create color space unified with vision. Because human eyes have three types of color sensors that respond to different ranges of wavelength, the complete drawing of all visual colors is three-dimensional. L* is luminance, u* and v* are chroma coordinates. For general images, the range of u* and v* is −100 to +100, and the luminance is 0 to 100.

The Histogram of Oriented Gradient (HOG) feature is a feature descriptor used for object detection in computer vision and image processing. The HOG features are obtained by calculating and making statistics of the gradient orientation histogram of local areas of the image.

The calculation method of each feature will be introduced below.

According to the following formula, the input RGB three-channel image with the resolution of 640×480 is subjected to LUV format transformation in CIE XYZ space to obtain the LUV image.

$$x=mr[0]*r+mg[0]*g+mb[0]*b$$

$$y=mr[1]*r+mg[1]*g+mb[1]*b$$

$$z=mr[2]*r+mg[2]*g+mb[2]*b$$

wherein, r, g and b refer to red, green and blue color channels in color image channels, respectively. mr, mg and mb are fixed constants and are in the form of vectors, and they correspond to the original RGB three-channel dimensions to calculate a color space mapping.

After calculating according to the above formula, the LUV image is reduced by 1:2 to obtain the luminance and chroma features of three channels.

Gradient amplitude features: for the L-channel in the LUV image, horizontal and vertical gradients Gx and Gy are calculated:

$$Gx[x,y]=(l[x+1,y]-l[x-1,y])/2$$

$$Gy[x,y]=(l[x,y+1]-l[x,y-1])/2$$

wherein, l refers to the luminance parameter in the L-channel;

then the gradient amplitude M and orientation angle O are further calculated:

$$M[x, y] = \sqrt{Gx[x, y]^2 + Gy[x, y]^2}$$

$$O[x, y] = \arccos\left(\frac{Gx[x, y]}{M[x, y]}\right).$$

The resolution of the feature M[x,y] is reduced by 1:2 to obtain 1-channel gradient amplitude feature.

HOG features: the gradient amplitude M[x,y] and orientation angle O[x,y] calculated above are used to calculate the gradient orientation histogram. The range of the gradient orientation angle O[x,y] is 0~π, and by quantifying the gradient orientation histogram into six intervals to obtain the six-channel HOG features.

As for other reference image layers, the above steps are also used to extract features so as to obtain four 10-channel reference feature layers (F0, F8, F16, F24).

The stage of dynamic pyramid building and target object detection will now be introduced.

Upon coming to this stage, the pyramid has generated four 10-channel reference feature layers. In order to make the image scale change slowly, as shown in Table 1 above, several (e.g., seven) intermediate layers are added between two adjacent reference layers to obtain a total of 29 layers. Thus, among the 29 layers of image feature data sets, there are four layers of reference image feature data sets (i.e. reference feature layers), and the rest 25 layers of image feature data set are the intermediate image feature data sets (i.e. intermediate feature layers) of the pyramid. In order to make the image scale change slowly, the embodiment of the present disclosure adopts the method of adding seven intermediate feature layers between adjacent reference feature layers, while the rest four intermediate feature layers are arranged under the reference feature layer F24, as shown in Table 1.

The idea of the embodiment of the present disclosure is to optimize the building of the rest 25 intermediate feature layers. With respect to the rest 25 intermediate feature layers, in order to reduce the computational complexity, the feature data are no longer generated from the intermediate image layers, but they are obtained by up-sampling and down-sampling the adjacent reference feature layers. Specifically:

features of layers F1, F2, F3 and F4 can be obtained by scaling features of layer F0;

features of layers F5, F6, F7, F9, F10, F11 and F12 can be obtained by scaling features of layer F8;

features of layers F13, F14, F15, F17, F18, F19 and F20 can be obtained by scaling features of layer F16;

features of layers F21, F22, F23, F25, F26, F27 and F28 can be obtained by scaling features of layer F24.

In the process of obtaining the intermediate layers based on scaling of the reference layers as described above, the scaling ratio of each intermediate layer can be obtained by establishing a fitting function, and then the scaling is performed according to that ratio. Since each reference feature layer is expected to be used for approximate estimation of the calculations of additional 7 layers of feature data (i.e. intermediate feature layers) in the design, the image resolution fitting function is used to define the interval.

The embodiment of the present disclosure uses the following 6-power polynomial function (image resolution fitting function) for estimation:

$$F(x)=a1x^6+a2x^5+a3x^4+a4x^3+a5x^2+a6x+a7.$$

Parameters of the terms of the above polynomial are as shown in the following Table 2.

TABLE 2

| reference image layer | | \multicolumn{7}{c|}{row/column fitting curve parameters (6-power polynomial)} | | | | | | |
|---|---|---|---|---|---|---|---|---|
| | | a1 | a2 | a3 | a4 | a5 | a6 | a7 |
| S0 | row | 0.0298 | −0.1854 | 0.0000 | 1.6189 | 0.0000 | −55.4634 | 640.0000 |
| | column | 0.0265 | −0.1555 | 0.0000 | 1.1705 | 0.0000 | −41.0415 | 480.0000 |
| S8 | row | 0.2264 | −0.4824 | −3.9156 | 4.6633 | 19.1630 | −30.6839 | 312.5146 |
| | column | −0.0014 | −0.0003 | 0.0182 | 0.0036 | 0.9465 | −21.0074 | 240.0204 |
| S16 | row | 0.0549 | −0.0700 | −1.0315 | 0.3185 | 5.5457 | −11.1853 | 159.6839 |
| | column | 0.0000 | 0.0026 | −0.0064 | −0.0291 | 0.3001 | −6.9408 | 79.8368 |
| S24 | row | −0.0097 | 0.0234 | 0.1464 | −0.2204 | −0.2748 | −6.9294 | 80.6323 |
| | column | −0.0042 | 0.0170 | 0.0513 | −0.2006 | 0.0351 | −4.9184 | 60.5099 |

As an example, when calculating the intermediate image layer based on the reference image layer S0, the coefficients of row and column polynomials corresponding to the reference image layer S0 in Table 2 are used to form the polynomial function F(x) mentioned above.

Specifically, taking the "row" of the reference feature layer S0 as an example, the polynomial function mentioned above is:

$$F(x)=0.0298x^6-0.1854x^5+1.6189x^3-55.4634x+640.0000.$$

Thus, when calculating the intermediate image layer S1, since the difference between S1 and S0 is 1, x=1 is substituted to obtain $F(x)=0.0298\times1^6-0.1854\times1^5+1.6189\times1^3-55.4634\times1+640.0000=585.9999\approx586$.

That is to say, after scaling according to the polynomial, the number of row pixels of the intermediate image layer S1 is 586.

Similarly, taking the "column" of the reference image layer S0 as an example, the polynomial function mentioned above is:

$$F(x)=0.0265x^6-0.1555x^5+1.1705x^3-41.0415x+480.0000.$$

Thus, when calculating the intermediate image layer S1, since the difference between S1 and S0 is 1, x=1 is substituted to obtain $F(x)=0.0265\times1^6-0.1555\times1^5+1.1705\times1^3-41.0415\times1+480.0000=440$.

That is to say, after scaling according to the polynomial, the number of column pixels of the intermediate image layer S1 is 440.

In this way, the image resolution of the intermediate image layer S1 is 586×440. Because the feature resolution of the intermediate feature layer corresponding to the intermediate image layer S1 is obtained by scaling both the rows and columns by ½ on the basis of the image resolution, the feature resolution of the intermediate feature layer F1 is 293×220.

It should be pointed out that when the intermediate image layer is obtained by down-sampling the reference image layer, the x in the above-mentioned polynomial is positive; otherwise, if the intermediate image layer is obtained by up-sampling the reference image layer, the x in the above-mentioned polynomial is negative. For example, when the image resolution of the intermediate image layer S23 is calculated based on the reference image layer S24, the x in the polynomial should be "−1".

Meanwhile, when a layer number difference between the intermediate image layer and its corresponding reference image layer is 2, if down-sampling is adopted, then x is 2, and if up-sampling is adopted, then x is −2. Similarly, the calculation method of other layers can be obtained in the same way, which will not be repeated here.

By using the above method, the feature resolution of each intermediate feature layer can be determined. With said feature resolution, the intermediate feature layer can be obtained by up-sampling and down-sampling based on the reference feature layer.

It shall be pointed out that the image resolution fitting function in the above-mentioned embodiment uses the 6-power polynomial function, but it is clear that inserting an intermediate layer between adjacent reference layers only requires that the image resolutions of the intermediate layers change in a reasonable ascending or descending order. Therefore, the image resolution fitting function can be realized not only by the 6-power polynomial function, but also by other increasing or decreasing functions, which is not restricted herein.

The intermediate feature layer other than the reference feature layer S0/S8/S16/S24 in the feature pyramid can be approximately solved by scaling the adjacent reference feature layers. During scaling, the corresponding reference feature layer is selected according to the pyramid data structure (Table 1), and 10 data channels thereof are down-sampled/up-sampled to obtain 10 data channels of the intermediate feature layer.

Down-sampling means that the sampling points are reduced. For a data matrix of N*M, assuming that the sampling coefficient is k, then one pixel point is taken at intervals of k pixel points from each row and each column to form an image.

Up-sampling is equivalent to two-dimensional interpolation. If the up-sampling coefficient is k, k−1 pixel points are inserted between pixel points n and n+1 in the original image, and interpolation is performed in row and column directions respectively. This method is similar to the bilinear interpolation method mentioned earlier, and will not be elaborated here.

The coefficient k of down-sampling or up-sampling can be represented by the ratio of resolutions of the layers.

For example, the building starts from layer F28 (28×21) that has the minimum feature resolution, then its nearest reference feature layer F24 (40×30) is down-sampled, the down-sampling coefficient in the row direction is 40/28, which is about 1.4, and the down-sampling coefficient in the column direction is 30/21, which is about 1.4. Thus, in the row direction, one pixel point is extracted at intervals of 1.4 pixel points and in the column direction, one pixel point is extracted at intervals of 1.4 pixel points, too. When extracting pixel points, position data of the extracted pixel points are rounded. Thus, the feature data set of layer F28 can be obtained. Then, the feature data set of said layer F28 is used to detect the target object, and if the target object is detected, the process is exited, otherwise, the feature layer building and the target object detection will be carried out in the next layer.

It should be noted that features of each layer contain features of 10 channels. The LUV features of the first 3 channels can be scaled directly to obtain the LUV features of the new scale; as for the features of the last 7 channels, they need to be multiplied by $$\left(\frac{scale_{new}}{scale_{ref}}\right)^{-0.43020001}$$

after being scaled. The objective of multiplying this coefficient is to make the feature obtained by approximate calculation closer to the feature extracted directly from the image, where $scale_{new}$ is the resolution of the layer to be calculated, and $scale_{ref}$ is the resolution of its reference layer.

In an embodiment of the present disclosure, detection of the target object may be implemented using an aggregate channel features (ACF) algorithm.

As mentioned above, after inputting the image, the feature data set of a certain layer of the image pyramid can be generated in the way described above.

The ACF algorithm includes: integrating and vectorizing the feature data set to facilitate matrix calculation in the subsequent classification algorithm; and then detecting potential target objects in the feature data set using an Adaboost machine learning classification algorithm. Adaboost is an iterative algorithm, whose core idea is to train different classifiers (weak classifiers) for the same training set, and then aggregate these weak classifiers to form a stronger final classifier (strong classifier).

It shall be pointed out that detecting target objects using the ACF algorithm is merely an embodiment of the present disclosure. Understandably, there are other detection methods in the field of detecting target objects in images, such as depth learning, machine vision and other technologies.

In some embodiments of the present disclosure, the image feature data sets of the remaining layers in the image pyramid are no longer built after the detection is stopped.

Thus, in the case of single target detection, if the target scale is detected at a certain scale, detection at the next scale is no longer carried out, and the remaining layers of the image pyramid are no longer built, thereby improving the detection efficiency.

Five images from an actual road are selected as test data in FIGS. 7A-7E to detect vehicles (target objects) that appear at different distances from an observer. Pyramid layers that need to be retrieved and the corresponding detection time are shown in Table 3 below.

TABLE 3

Figure 7A:
FIG. 7A is a schematic diagram of a test datum according to an embodiment of the present disclosure.
Figure 7B:
FIG. 7B is a schematic diagram of another test datum according to an embodiment of the present disclosure.
Figure 7C:
FIG. 7C is a schematic diagram of yet another test datum according to an embodiment of the present disclosure.
Figure 7D:
FIG. 7D is a schematic diagram of still another test datum according to an embodiment of the present disclosure.
Figure 7E:
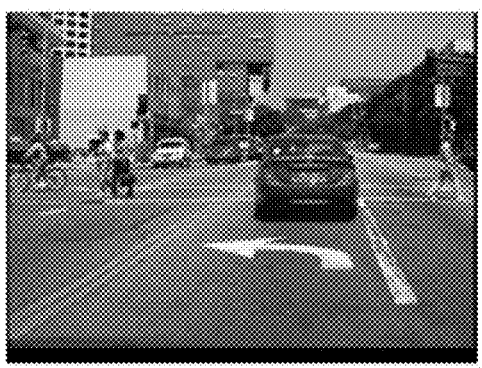
FIG. 7E is a schematic diagram of still another test datum according to an embodiment of the present disclosure.

| Data set | FIG. 7A | FIG. 7B | FIG. 7C | FIG. 7D | FIG. 7E |
| --- | --- | --- | --- | --- | --- |
| Pyramid layer retrieved | 14 | 22 | 13 | 24 | 9 |

TABLE 3-continued

| Data set | FIG. 7A | FIG. 7B | FIG. 7C | FIG. 7D | FIG. 7E |
| --- | --- | --- | --- | --- | --- |
| Detection time ms (statically built) | 138 | 190 | 129 | 223 | 135 |
| Detection time ms (dynamically built/present disclosure) | 31 | 112 | 20 | 163 | 23 |
| Speed boost | 77.5% | 41.05% | 84.49% | 26.90% | 82.96% |

For different vehicles (target objects), since they appear at different distances from the observer, the number of layers of pyramid that need to be built for detecting the vehicles is different. The larger the number of layers of the pyramid needed, the farther the target object is from the observer, and the smaller the number of layers of the pyramid needed, the closer the target object is from the observer.

As can be seen from Table 3, when the vehicle is close to the observer (the number of layers that need to be built is less than 15), once a single vehicle is detected, it is no longer necessary to build the rest large scale image feature data sets, so the building processing thereof is skipped, a lot of redundant time is reduced, and the speed is increased obviously. When the vehicle is far away from the observer and it is necessary to build large scale image feature data sets of the pyramid, the speed increase is reduced, but still the building of some data is skipped, thus improving the running speed.

Figure 8:
FIG. 8 is a schematic diagram of a detected target object according to an embodiment of the present disclosure.

Alternatively, after the detection is stopped, there can also be a step of identifying the target object in the image to be detected when the target object is detected. Alternatively, as shown in FIG. 8, the identification can be implemented in a box selection manner, which enables a user to see the detection results at a glance and improves the user experience.

A second aspect of the present disclosure provides an apparatus 200 for detecting a target object in an image is provided, which can improve the efficiency of detecting target objects in images to some extent.

Figure 9:
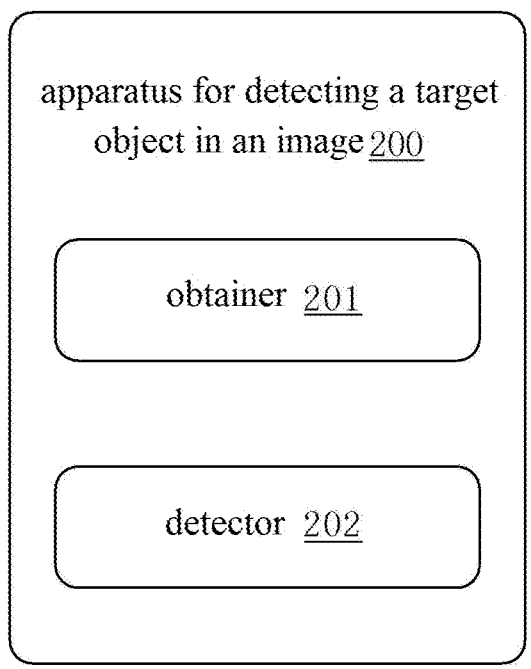
FIG. 9 is a structural diagram of an apparatus for detecting a target object in an image according to an embodiment of the present disclosure.

As shown in FIG. 9, the apparatus 200 for detecting a target object in an image comprises:
an obtainer 201 configured to obtain an image to be detected;
a detector 202 configured to:
determine a first layer of an image pyramid as a current layer for which an image feature data set is to be built;
build an image feature data set of the current layer of the image pyramid according to the image to be detected, and detect the target object from the image feature data set of the current layer;
in response to detecting the target object, stop the detection and output the detected target object;
in response to not detecting the target object, determine a next layer of the current layer as the current layer for which the image feature data set is to be built and return to the step of building the image feature data set of the current layer of the image pyramid according to the image to be detected and detecting the target object from the image feature data set of the current layer, wherein a feature resolution of the image feature data set of the next layer of the current layer is higher than that of the image feature data set of the current layer.

Alternatively, the feature resolution of the image feature data set of the first layer of the pyramid is smaller than or equal to 40×30, such that the apparatus for detecting target objects in images can detect target objects of larger sizes from the very beginning, and as the feature resolution of the image feature data set increases gradually, the sizes of the target objects that can be detected decrease gradually.

The apparatus for detecting a target object in an image as provided in the embodiment of the present disclosure adopts the method of dynamically building the image pyramid and dynamically detecting the target object at the same time, wherein target object detection is performed immediately after building the image feature data set of one layer of the pyramid, and if no target object is detected, the image feature data set of the next layer of the pyramid is built, until a target object is detected. In this case, there is no need to build a complete image pyramid at one time, thus improving the efficiency of image detection.

Alternatively, the target object is the vehicle in the image to be detected.

Alternatively, the preset total number of layers of the image pyramid is 29, the image resolution of the reference image in the first layer of the pyramid is 80×60, and the feature resolution of the image feature data set in the first layer of the pyramid is 28×21.

Alternatively, the detector is configured to detect the target object in the image feature data set of the current layer using the ACF algorithm.

Alternatively, the detector 202 is further configured to: stop building the image feature data sets of the rest layers of the image pyramid when the detection stops.

Alternatively, the detector is further configured to:
build the reference image layers according to the image to be detected;
obtain the corresponding reference image feature data sets according to the reference image layers;
build the image feature data sets of the pyramid based on the reference image feature data sets of the pyramid.

Alternatively, the detector is further configured to:
determine the number of the reference image layers;
scale the image to be detected by using the bilinear interpolation method to obtain the reference image layers, wherein one reference image layer is obtained from each scaling, and the number of times of scaling is one less than the number of reference image layers.

Alternatively, the detector is further configured to:
extract luminance and chroma features of the reference image layer;
extract gradient amplitude features and an orientation angle of the reference image layer according to the luminance and chroma features of the reference image layer;
extract histogram of oriented gradient features of the reference image layer according to the gradient amplitude features and orientation angle of the reference image layer;
determine the luminance and chroma features, the gradient amplitude features and the histogram of oriented gradient features as the reference image feature data set of the pyramid corresponding to the reference image layer.

Alternatively, the detector is further configured to:
determine the number of hierarchies of the image feature data sets of the pyramid;
determine the number of hierarchies of the intermediate image feature data sets of the pyramid according to the number of hierarchies of the reference image feature data sets of the pyramid and the number of hierarchies of the image feature data sets of the pyramid;
determine the number of hierarchies of the intermediate image feature data sets between the adjacent reference image feature data sets of the pyramid according to the number of hierarchies of the reference image feature data sets of the pyramid and the number of hierarchies of the intermediate image feature data set of the pyramid;

in response to the current layer of the pyramid being a reference image layer, directly invoke the reference image feature data set corresponding to the reference image layer as the image feature data set of the current layer;

in response to the current layer of the pyramid being an intermediate image layer between the reference image layers, down-sample or up-sample the reference image feature data set of the reference image layer adjacent to the intermediate image layer so as to obtain the intermediate image feature data set corresponding to the intermediate image layer as the image feature data set of the current layer.

Alternatively, the detector is further configured to:
formulate the image resolution fitting function based on the reference image layer;
calculate the image resolution of the intermediate image layer according to the image resolution fitting function;
determine the ratio of the image resolution of the intermediate image layer to that of the reference image layer as the sampling coefficient.

Alternatively, the image resolution fitting function is a 6-power polynomial function.

It shall be noted that the embodiment of the above-mentioned embodiment of the apparatus for detecting a target object in an image corresponds to the previously described method for detecting a target object in an image. Accordingly, the technical effect of the embodiment of the apparatus for detecting a target object in an image is the same as or similar to the technical effect of any of the above-described embodiments of the method.

Figure 10:
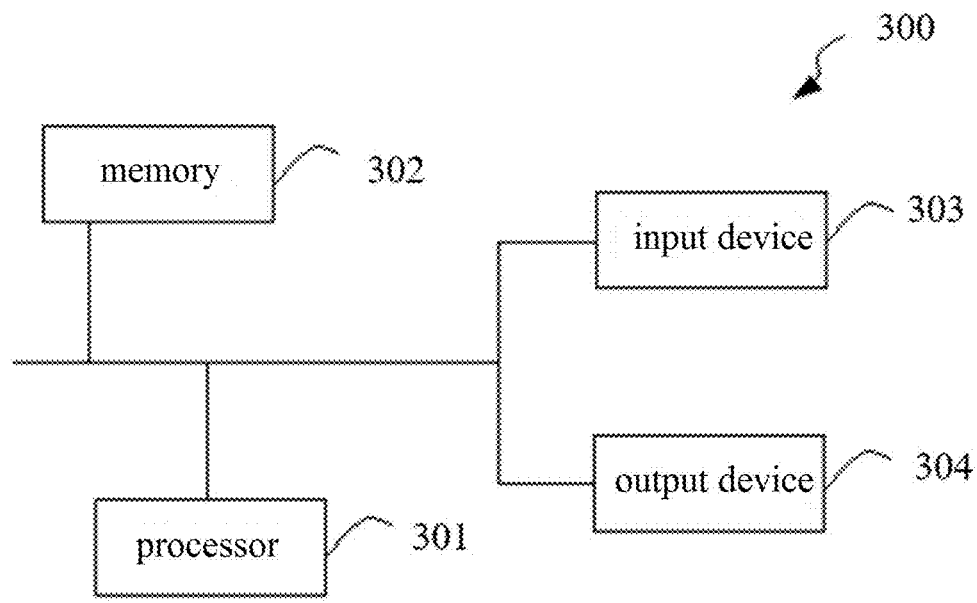
FIG. 10 is a structural block diagram of an example computing device that can implement the various techniques described herein according to an embodiment of the present disclosure.

FIG. 10 illustrates an example computing device 300 that can implement the various techniques described herein. As shown in FIG. 10, the device 300 includes one or more processors 301 and a memory 302. For brevity, only one processor is shown in FIG. 10. The computing device 300 can also include an input device 303 and an output device 304.

The processor 301, memory 302, input device 303 and output device 304 can be communicatively coupled together by buses or other means. The bus may include any one or combinations of different bus structures such as memory buses or memory controllers, peripheral buses, universal serial buses, and/or processors or local buses utilizing any of the various bus architectures. Various other examples, such as control and data lines, are also envisaged.

The processor 301 may be composed of (multiple) semi-conductors and/or transistors (e.g., electronic integrated circuits (IC)).

The memory 302 can be a computer-readable storage medium, for example. The memory 302 may include a volatile medium (such as a random access memory (RAM)) and/or a non-volatile medium (such as read-only memory (ROM), flash memory, optical disc, magnetic disc, etc.). The memory 302 may include a fixed medium (e.g., RAM, ROM, fixed hard disc drive, etc.) and a movable medium (e.g., flash memory, removable hard disc drive, optical disc, etc.). As a non-volatile computer readable storage medium, the memory 302 can be used to store computer instructions/modules, such as computer instructions/modules corresponding to the method for detecting a target object in an image described in the embodiment of this disclosure. For example, the obtainer 201 and detector 202 shown in FIG.

9 can be implemented as corresponding computer instructions/modules. The processor 301 runs the computer instructions/modules stored in the memory 302 to execute the method for detecting a target object in an image as described in the above method embodiments.

The input device 303 can receive input data (e.g., image data) or character information, and generate key signal inputs related to user settings and functional control of the apparatus for detecting a target object in an image. The output device 304 can be used to present the results generated by detecting the target object in the image, and so on. Examples of the input device include keyboards, cursor control devices (e.g., mouse), microphones (e.g., for voice input), scanners, touch functions (e.g., capacitive or other sensors configured to sense physical touches), cameras (e.g., capable of detecting motions that do not involve touch as gestures using visible or invisible wavelengths (such as infrared frequencies)), and so on. Examples of the output device include display devices (e.g., monitors or projectors), speakers, printers, network cards, tactile response devices, etc.

The memory may, for example, be a non-transient computer storage medium that stores computer-executable instructions which, when executed by a processor, can execute the method described in any of the above-mentioned method embodiments.

It should be noted that those ordinarily skilled in the art will understand that all or part of the flows in the method described above can be accomplished by relevant hardware instructed by computer programs.

In various embodiments, the computing device 300 may employ various configurations. For example, the computing device 300 can be implemented as a computer-like device including a personal computer, a desktop computer, a multi-screen computer, a laptop computer, a netbook, etc. The computing device 300 can also be implemented as a mobile-device-like equipment including such mobile devices as mobile phones, portable music players, portable game devices, tablets and multi-screen computers. The computing device 300 can also be implemented as a television-like device, including devices with or connected to a generally larger screen in a leisure viewing environment. These devices include televisions, set-top boxes, game consoles, etc.

The techniques described herein can be supported by the various configurations of the computing device 300 and are not limited to the specific examples of the techniques described herein. The functions can also be fully or partially achieved by using distributed systems.

Various technologies are described herein in the general context of software, hardware components or program modules. Generally, these modules include routines, programs, objects, elements, components, data structures that perform specific tasks or implement specific abstract data types. The terms "module", "function" and "component" used herein generally refer to software, firmware, hardware or combinations thereof. The features of the technologies described herein are platform independent, which means that these technologies can be implemented on various computing platforms with various processors. It will also be apparent to those skilled in the art that the various exemplary logic blocks, modules, circuits and method steps described herein may be implemented as electronic hardware, computer software or a combination of both. In order to clearly illustrate the interchangeability of hardware and software, the functions of various schematic components, blocks, modules, circuits and steps have been described generally. Whether the functions are implemented as software or as hardware depends on the specific application and the design constraints imposed on the whole system. Those skilled in the art may implement the functions in various ways for each specific application, but such implementation should not be interpreted as leading to departure from the scope of the present disclosure.

The various exemplary logic blocks, modules and circuits described herein may utilize the following components designed to achieve the functions described herein: general purpose processors, digital signal processors (DSPs), application specific integrated circuits (ASICs), field programmable gate arrays (FPGAs), or other programmable logic devices, discrete gates or transistor logic, separate hardware components or any combinations of these components. The general purpose processor may be a microprocessor, alternatively, the processor may be any conventional processor, controller, microcontroller or state machine. The processor can also be implemented as combinations of computing devices, such as a combination of DSP and microprocessor, multiple microprocessors, one or more microprocessors combined with a DSP core, or any other such configurations.

The methods or steps of the methods described herein may be directly included in hardware, in software modules executed by processors, or in combinations of the two. Software modules may reside in RAM memories, flash memories, ROM memories, EPROM memories, EEPROM memories, registers, hard discs, removable discs, CD-ROMs, or any other forms of storage medium known in the art. An exemplary storage medium is to coupled to the processor so that the processor can read information from or write information into the storage medium. In an alternative scheme, the storage medium can be integrated with the processor. The processors and storage media can reside in an ASIC. The ASIC can reside in a user terminal. In an alternative scheme, the processors and storage media can reside in the user terminal as discrete components.

In one or more example designs, the functions described can be implemented in hardware, software, firmware or any combinations thereof. When implemented in software, the functions can be stored as one or more instructions or codes on a computer-readable medium or be transmitted through a computer-readable medium. The computer-readable medium includes a computer storage medium and a communication medium that includes any medium capable of facilitating transmission of a computer program from one location to another. The storage medium may be any available medium that can be accessed by a general purpose or dedicated computer. As an example, rather than a limitation, the computer-readable medium may include RAM, ROM, EEPROM, CD-ROM or other optical disc storage devices, magnetic disc storage devices or other magnetic storage devices, or may be any other medium that can be used to carry or store the needed program codes which appear in the form of instructions or data structures and can be accessed by the general purpose or dedicated computer or general purpose or dedicated processor. In addition, any connection can be appropriately referred to as a computer-readable medium. For example, if software is sent from a website, a server or other remote sources using a coaxial cable, an optical fiber cable, a twisted pair, a digital subscriber line (DSL) or wireless technologies such as infrared, radio and microwave, then the above-mentioned coaxial cable, optical fiber cable, twisted pair, DSL or wireless technologies such as infrared, radio and microwave all fall into the definition of medium. As used here, the magnetic discs and optical discs include compact discs (CD), laser discs, optical discs, digital multifunctional discs (DVD), floppy discs and Blu-ray discs, where the magnetic discs usually reproduce data magnetically, while the optical discs reproduce data optically using lasers. Combinations of the above contents should also be included in the scope of computer-readable media.

It should be understood that, for clarity, embodiments of the present disclosure are described with reference to different functional modules. However, it will be obvious that without departing from the present disclosure, the functionality of each functional module can be implemented in a single module, in multiple modules or as part of other functional modules. For example, the functionality described as being implemented by a single module can be implemented by multiple different modules. Therefore, reference to specific functional modules is considered only as reference to appropriate modules for providing the described functionality, rather than indicating strict logical or physical structures or organizations. Therefore, the present disclosure may be implemented in a single module or may be physically and functionally distributed between different modules and circuits.

It will be understood that although the terms like first, second and third may be used herein to describe various devices, elements, or components, these devices, elements, or components should not be limited by such terms. These terms are used only to distinguish one device, element or component from another.

Although the present disclosure has been described in conjunction with some embodiments, it is not intended to be limited to the specific forms described herein. On the contrary, the scope of the present disclosure is limited only by the appended claims. Additionally, although individual features may be included in different claims, these features may be advantageously combined, and being included in different claims does not mean that combination of said features is not feasible and/or advantageous. The sequence of the features in the claims does not imply any particular sequence for the features to function. In addition, in the claims, the word "include" does not mean to exclude other elements, and the indefinite article "a" or "an" does not mean to exclude multiple elements. The reference numerals in the claims are provided only as clear examples and should not be construed as limiting the scope of the claims in any way.

The invention claimed is:

1. A method for detecting a target object in an image, comprising:
   obtaining an image to be detected;
   determining a first layer of an image pyramid as a current layer for which an image feature data set is to be built;
   building the image feature data set of the current layer of the image pyramid according to the image to be detected, and detecting the target object from the image feature data set of the current layer;
   in response to detecting the target object, stopping the detection and outputting the target object that was detected; and
   in response to not detecting the target object and a number of layers of the image pyramid not reaching a threshold for the number of layers, determining a next layer of the current layer as the current layer for which the image feature data set is to be built and returning to the building the image feature data set of the current layer of the image pyramid according to the image to be detected and detecting the target object from the image feature data set of the current layer,
   wherein a feature resolution of the image feature data set of the next layer of the current layer is higher than that of the image feature data set of the current layer.

2. The method of claim 1, wherein the feature resolution of the image feature data set of the first layer of the image pyramid is less than or equal to 40×30.

3. The method of claim 1, wherein building the image feature data set of the current layer of the image pyramid according to the image to be detected further comprises:
   building reference image layers according to the image to be detected;
   obtaining a reference image feature data set corresponding to each reference image layer of the reference image layers; and
   building the image feature data set of the current layer of the image pyramid based on the reference image feature data set.

4. The method of claim 3, wherein building the reference image layers according to the image to be detected comprises:
   determining a number of the reference image layers; and
   scaling the image to be detected by using a bilinear interpolation method to obtain the reference image layers,
   wherein one reference image layer is obtained from each scaling, and a number of times of scaling is one less than the number of the reference image layers.

5. The method of claim 3, wherein obtaining the reference image feature data set corresponding to each reference image layer of the reference image layers comprises:
   extracting luminance and chroma features of said each reference image layer;
   extracting gradient amplitude features and an orientation angle of said each reference image layer according to the luminance and chroma features of the reference image layer;
   extracting a histogram of oriented gradient features of the reference image layer according to the gradient amplitude features and orientation angle of the reference image layer; and
   determining the luminance and chroma features, the gradient amplitude features and the histogram of oriented gradient features as the reference image feature data set corresponding to the reference image layer.

6. The method of claim 3, wherein building the image feature data set of the current layer of the image pyramid based on the reference image feature data sets comprises:
   determining a number of hierarchies of image feature data sets of the image pyramid;
   determining a number of hierarchies of intermediate image feature data sets of the image pyramid according to a number of hierarchies of the reference image feature data sets of the image pyramid and the number of hierarchies of the image feature data sets of the image pyramid;
   determining the number of hierarchies of intermediate image feature data sets between adjacent reference image feature data sets of the image pyramid according to the number of hierarchies of the reference image feature data sets of the image pyramid and the number of hierarchies of the intermediate image feature data sets of the image pyramid;
   in response to the current layer of the image pyramid being a reference image layer, directly invoking the reference image feature data set corresponding to the reference image layer as the image feature data set of the current layer; and in response to the current layer of the image pyramid being an intermediate image layer between the reference image layers, down-sampling or up-sampling the reference image feature data set of a reference image layer adjacent to the intermediate image layer so as to obtain an intermediate image feature data set corresponding to the intermediate image layer as the image feature data set of the current layer.

7. The method of claim 6, wherein a sampling coefficient for the down-sampling or the up-sampling is determined by operations comprising:
formulating an image resolution fitting function based on the reference image layer;
calculating an image resolution of the intermediate image layer according to the image resolution fitting function; and
determining a ratio of the image resolution of the intermediate image layer to that of the reference image layer as the sampling coefficient.

8. The method of claim 7, wherein the image resolution fitting function comprises a 6-power polynomial function.

9. The method of claim 1, wherein detecting the target object from the image feature data set of the current layer comprises:
detecting the target object from the image feature data set of the current layer using an aggregate channel features (ACF) algorithm.

10. An apparatus for detecting a target object in an image, comprising:
an obtainer configured to obtain an image to be detected;
a detector configured to:
determine a first layer of an image pyramid as a current layer for which an image feature data set is to be built;
build an image feature data set of the current layer of the image pyramid according to the image to be detected, and detect the target object from the image feature data set of the current layer;
in response to detecting the target object, stop the detection and output the target object that was detected; and
in response to not detecting the target object and a number of layers of the image pyramid not reaching a threshold for the number of layers, determine a next layer of the current layer as the current layer for which the image feature data set is to be built and return to build the image feature data set of the current layer of the image pyramid according to the image to be detected and detect the target object from the image feature data set of the current layer,
wherein a feature resolution of the image feature data set of the next layer of the current layer is higher than that of the image feature data set of the current layer.

11. The apparatus of claim 10, wherein the feature resolution of the image feature data set of the first layer of the image pyramid is less than or equal to 40×30.

12. The apparatus of claim 10, wherein the detector is further configured to:
build reference image layers according to the image to be detected;
obtain a reference image feature data set corresponding to each reference image layer according to the reference image layers; and
build the image feature data set of the current layer of the image pyramid based on reference image feature data sets.

13. The apparatus of claim 12, wherein the detector is further configured to:
determine a number of the reference image layers; and
scale the image to be detected by using a bilinear interpolation method to obtain the reference image layers, wherein one reference image layer is obtained from each scaling, and a number of times of scaling is one less than the number of the reference image layers.

14. The apparatus of claim 12, wherein the detector is further configured to:
extract luminance and chroma features of said each reference image layer;
extract gradient amplitude features and an orientation angle of the reference image layer according to the luminance and chroma features of the reference image layer;
extract a histogram of oriented gradient features of the reference image layer according to the gradient amplitude features and the orientation angle of the reference image layer; and
determine the luminance and chroma features, the gradient amplitude features and the histogram of oriented gradient features as the reference image feature data set corresponding to the reference image layer.

15. The apparatus of claim 12, wherein the detector is further configured to:
determine a number of hierarchies of the image feature data sets of the image pyramid;
determine a number of hierarchies of intermediate image feature data sets of the image pyramid according to a number of hierarchies of the reference image feature data sets of the image pyramid and the number of hierarchies of the image feature data sets of the image pyramid;
determine the number of hierarchies of intermediate image feature data sets between adjacent reference image feature data sets of the image pyramid according to the number of hierarchies of the reference image feature data sets of the image pyramid and the number of hierarchies of the intermediate image feature data sets of the image pyramid;
in response to the current layer of the image pyramid being a reference image layer, directly invoke the reference image feature data set corresponding to the reference image layer as the image feature data set of the current layer; and
in response to the current layer of the image pyramid being an intermediate image layer between the reference image layers, down-sample or up-sample the reference image feature data set of a reference image layer adjacent to the intermediate image layer so as to obtain an intermediate image feature data set corresponding to the intermediate image layer as the image feature data set of the current layer.

16. The apparatus of claim 15, wherein the detector is further configured to:
formulate an image resolution fitting function based on the reference image layer;
calculate an image resolution of the intermediate image layer according to the image resolution fitting function; and
determine a ratio of the image resolution of the intermediate image layer to that of the reference image layer as a sampling coefficient.

17. The apparatus of claim 16, wherein the image resolution fitting function comprises a 6-power polynomial function.

18. The apparatus of claim 10, wherein the detector is configured to detect the target object from the image feature data set of the current layer using an aggregate channel features (ACF) algorithm.

19. A computing device, comprising:
   at least one processor; and
   a memory communicatively connected to the at least one processor,
   wherein, the memory is configured to store computer-executable instructions which, when being executed by the at least one processor, enable the at least one processor to execute the method of claim 1.

20. A non-transitory computer-readable storage medium storing computer-executable instructions which, when being executed by at least one processor, executes the method of claim 1.

\* \* \* \* \*